(12) United States Patent
Langenbacher et al.

(10) Patent No.: US 9,701,352 B2
(45) Date of Patent: *Jul. 11, 2017

(54) METHOD OF MANUFACTURING VEHICLE TRIM COMPONENT HAVING BEVERAGE RETAINER

(71) Applicant: Ford Global Technologies, LLC, Dearborn, MI (US)

(72) Inventors: Kim Langenbacher, St. Clair Shores, MI (US); Steve Dreher, Brownstown, MI (US); Scott H. Dunham, Redford, MI (US); Ammad Bhatti, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 37 days.

This patent is subject to a terminal disclaimer.

(21) Appl. No.: 14/797,455

(22) Filed: Jul. 13, 2015

(65) Prior Publication Data
US 2015/0314819 A1    Nov. 5, 2015

Related U.S. Application Data

(60) Division of application No. 14/164,568, filed on Jan. 27, 2014, now Pat. No. 9,114,839, which is a
(Continued)

(51) Int. Cl.
*B21D 53/88* (2006.01)
*B62D 65/02* (2006.01)
(Continued)

(52) U.S. Cl.
CPC .............. *B62D 65/02* (2013.01); *B21D 53/88* (2013.01); *B60N 2/466* (2013.01); *B60N 3/10* (2013.01);
(Continued)

(58) Field of Classification Search
CPC .............. B21D 53/88; Y10T 29/49876; Y10T 29/49622; Y10T 29/24; B60R 2021/161;
(Continued)

(56) References Cited

U.S. PATENT DOCUMENTS 3,808,743 A    5/1974 Renner et al.
4,303,109 A    12/1981 Cohen
(Continued)

FOREIGN PATENT DOCUMENTS

KR    20010055591 A    7/2001
WO    2005058649 A1    6/2005

OTHER PUBLICATIONS

2006 SRX Cadillac, Copyright: 2006: Harvey Schwartz—Editor, Automotive Addicts, http://www.automotiveaddicts.com/magazine/2006cadillacsrxtestdrive.html, 5 pages.
(Continued)

*Primary Examiner* — Jermie Cozart
(74) *Attorney, Agent, or Firm* — Vichit Chea; Price Heneveld LLP (57) ABSTRACT

A vehicle trim assembly is provided having a beverage retainer formed in a storage compartment on the door of an automotive vehicle. The trim assembly includes a storage receptacle and a trim component such as a trim panel arranged to define at least a portion of the storage receptacle. The trim panel includes a base portion connected to a beverage retainer portion via a living hinge. The beverage retainer portion is pivoted about the living hinge into position within the storage receptacle. The trim assembly may include a trim component assembled onto a pillar and pivoted about the living hinge between a use position and a stored position.

12 Claims, 11 Drawing Sheets

Related U.S. Application Data continuation-in-part of application No. 14/023,535, filed on Sep. 11, 2013, now Pat. No. 8,863,367, which is a division of application No. 13/115,512, filed on May 25, 2011, now Pat. No. 8,562,065.

(51) Int. Cl.

| | | |
|---|---|---|
| *B60R 7/04* | (2006.01) | |
| *B60R 13/02* | (2006.01) | |
| *B60N 3/10* | (2006.01) | |
| *B60N 2/46* | (2006.01) | |
| *B29C 45/00* | (2006.01) | |

(52) U.S. Cl.
CPC ............. *B60N 3/101* (2013.01); *B60N 3/102* (2013.01); *B60N 3/108* (2013.01); *B60R 7/046* (2013.01); *B60R 13/0243* (2013.01); *B29C 45/0081* (2013.01); *Y10T 29/49622* (2015.01); *Y10T 29/49826* (2015.01); *Y10T 29/49828* (2015.01); *Y10T 29/49876* (2015.01)

(58) Field of Classification Search
CPC . B60R 21/207; B60R 21/215; B60R 13/0243; B60R 13/0206; B60N 3/102
See application file for complete search history.

(56) References Cited

U.S. PATENT DOCUMENTS

| | | |
|---|---|---|
| 4,530,480 A | 7/1985 | Pratt |
| 4,619,477 A | 10/1986 | Kneib et al. |
| 4,630,319 A | 12/1986 | Mathis |
| 4,634,089 A | 1/1987 | Wright et al. |
| 4,645,157 A | 2/1987 | Parker |
| 4,655,425 A | 4/1987 | Wallace et al. |
| 4,678,154 A | 7/1987 | McFarland |
| 4,712,823 A | 12/1987 | Mills et al. |
| 4,724,986 A | 2/1988 | Kahn |
| 4,728,018 A | 3/1988 | Parker |
| 4,749,112 A | 6/1988 | Harper |
| 4,779,831 A | 10/1988 | Anderson |
| 4,801,060 A | 1/1989 | Thompson |
| 4,844,400 A | 7/1989 | Jasmagy, Jr. |
| 4,852,843 A | 8/1989 | Chandler |
| 5,042,770 A | 8/1991 | Louthan |
| 5,249,770 A | 10/1993 | Louthan |
| 5,330,145 A | 7/1994 | Evans et al. |
| 5,407,158 A | 4/1995 | Baird |
| 5,494,249 A | 2/1996 | Ozark et al. |
| 5,524,958 A | 6/1996 | Wieczorek et al. |
| 5,833,194 A | 11/1998 | Jones et al. |
| 6,116,672 A | 9/2000 | Cannon et al. |
| 6,135,530 A | 10/2000 | Blaszczak et al. |
| 6,481,239 B2 | 11/2002 | Hodosh et al. |
| 6,513,687 B1 | 2/2003 | Siniarski |
| 6,560,983 B1 | 5/2003 | Schimmeyer |
| 6,615,546 B2 | 9/2003 | Furuyama et al. |
| 6,692,053 B1 | 2/2004 | Smith |
| 6,715,726 B1 | 4/2004 | Dybalski |
| 6,971,698 B1 | 12/2005 | King |
| 7,147,259 B2 | 12/2006 | Radu et al. |
| 7,244,383 B2 | 7/2007 | Youngs et al. |
| 7,517,002 B2 | 4/2009 | Reed et al. |
| 7,537,258 B2 | 5/2009 | Quijano et al. |
| 7,594,686 B2 | 9/2009 | Augustyn |
| 7,681,939 B2 | 3/2010 | Augustyn |
| 7,753,196 B2 | 7/2010 | Cuomo |
| 7,971,923 B2 | 7/2011 | Mazur et al. |
| 8,020,913 B2 | 9/2011 | Kwolek |
| 8,066,148 B2 | 11/2011 | Garahan |
| 8,303,016 B2 | 11/2012 | Pauken et al. |
| 8,562,065 B2 | 10/2013 | Langenbacher et al. |
| 8,863,367 B2 | 10/2014 | Langenbacher et al. |
| 2004/0084458 A1 | 5/2004 | Krueger et al. |
| 2005/0189459 A1 | 9/2005 | Sturt et al. |
| 2005/0205739 A1 | 9/2005 | DePue et al. |
| 2005/0224674 A1 | 10/2005 | Park |
| 2006/0214075 A1 | 9/2006 | Cassettari et al. |
| 2007/0145760 A1 | 6/2007 | Gresham et al. |
| 2007/0222249 A1 | 9/2007 | Valentage et al. |
| 2007/0284902 A1 | 12/2007 | Reed et al. |
| 2009/0001748 A1 | 1/2009 | Brown et al. |
| 2009/0108618 A1 | 4/2009 | Hanson et al. |
| 2009/0140023 A1 | 6/2009 | Noble |
| 2009/0278380 A1 | 11/2009 | Bhattacharjee et al. |
| 2012/0126570 A1 | 5/2012 | Nagamura et al. |
| 2013/0027955 A1 | 1/2013 | Grote, III et al. |
| 2013/0027976 A1 | 1/2013 | Robbins et al. |

OTHER PUBLICATIONS

2010 Lexus RX450h All-Wheel Drive; Car and Driver, http://www.caranddriver.com/reviews/car/09q3/2010_lexus_rx450h_all-wheel_drive-short_take_road_test/gallery/2010_lexus_rx450h_door_storage_compartment_photo_50; Copyright © 2010 Hachette Filipacchi Media U.S., Inc., 5 pages.

METHOD OF MANUFACTURING VEHICLE TRIM COMPONENT HAVING BEVERAGE RETAINER

CROSS-REFERENCE TO RELATED APPLICATIONS

This application is a divisional of U.S. patent application Ser. No. 14/164,568, filed on Jan. 27, 2014, entitled "VEHICLE TRIM COMPONENT HAVING BEVERAGE RETAINER AND METHOD," now U.S. Pat. No. 9,114,839 B2, which is a continuation-in-part of U.S. patent application Ser. No. 14/023,535, filed on Sep. 11, 2013, entitled "VEHICLE TRIM PANEL HAVING BEVERAGE RETAINER AND METHOD," now U.S. Pat. No. 8,863,367, which is a divisional of U.S. patent application Ser. No. 13/115,512, filed on May 25, 2011, entitled "VEHICLE TRIM PANEL HAVING BEVERAGE RETAINER AND METHOD," now U.S. Pat. No. 8,562,065. The aforementioned related applications are hereby incorporated by reference.

FIELD OF THE INVENTION

The present invention generally relates to vehicle storage receptacles and beverage holders, and more particularly relates to a vehicle trim panel having a beverage retainer provided within a storage receptacle.

BACKGROUND OF THE INVENTION

Automotive vehicles are commonly equipped with various trim components which provide aesthetically pleasing and functional features onboard the vehicle. For example, trim panels are assembled onto vehicle doors and configured to provide storage receptacles for storing items onboard the vehicle. Some storage receptacles are commonly referred to as map pockets that are configured to contain items stowed on the door such that the stowed items are easily accessible to passengers of the vehicle.

Some automotive vehicles also employ drink or beverage holders provided in the storage receptacles to retain beverage containers such that the containers do not tip over during vehicle acceleration or deceleration. However, conventional beverage holders are typically fabricated as separate pieces which require multiple parts and tooling to make and assemble the beverage holder and storage compartment and handle the parts during assembly. It is therefore desirable to provide for an enhanced storage receptacle with a beverage holder that employs reduced part, tooling and assembling costs.

SUMMARY OF THE INVENTION

According to one aspect of the present invention, a vehicle trim component is provided. The vehicle trim component includes a base portion, a beverage retainer portion, and a living hinge connected to the base portion and the beverage retainer portion. The beverage retainer portion is pivoted about the living hinge into a use position.

According to another aspect of the present invention, a method of assembling a vehicle trim component is provided. The method of assembling a vehicle includes forming a trim component having a main portion, a beverage retainer portion, and a living hinge. The method also includes assembling the trim component onto a vehicle and rotating the beverage retainer portion about the living hinge into a beverage retainer position.

These and other aspects, objects, and features of the present invention will be understood and appreciated by those skilled in the art upon studying the following specification, claims, and appended drawings.

DETAILED DESCRIPTION OF PREFERRED EMBODIMENTS

Figure 1:
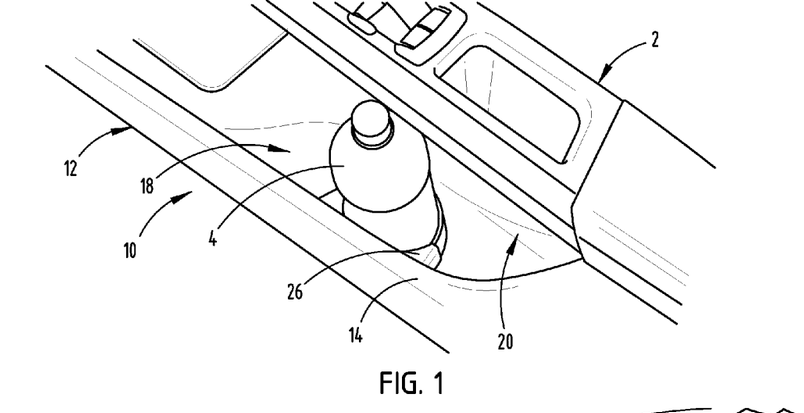
FIG. 1 is a elevated perspective view of a vehicle door employing a storage receptacle with a beverage retainer provided therein, according to one embodiment.
Figure 2:
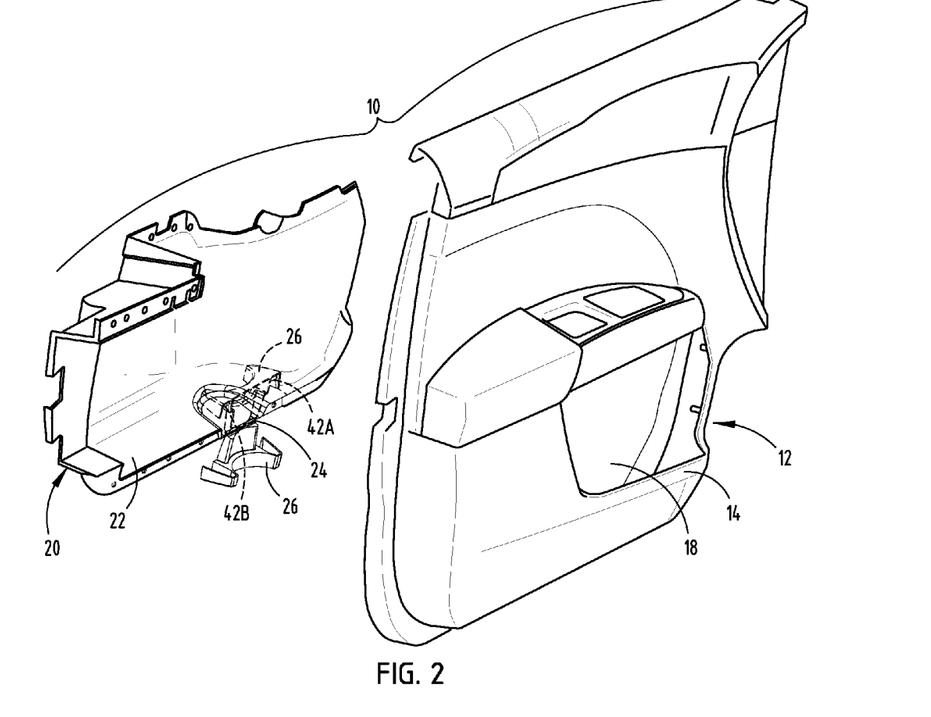
FIG. 2 is an exploded inner perspective view of the door illustrating an outer trim panel and an inner trim panel forming the storage receptacle.
Figure 3:
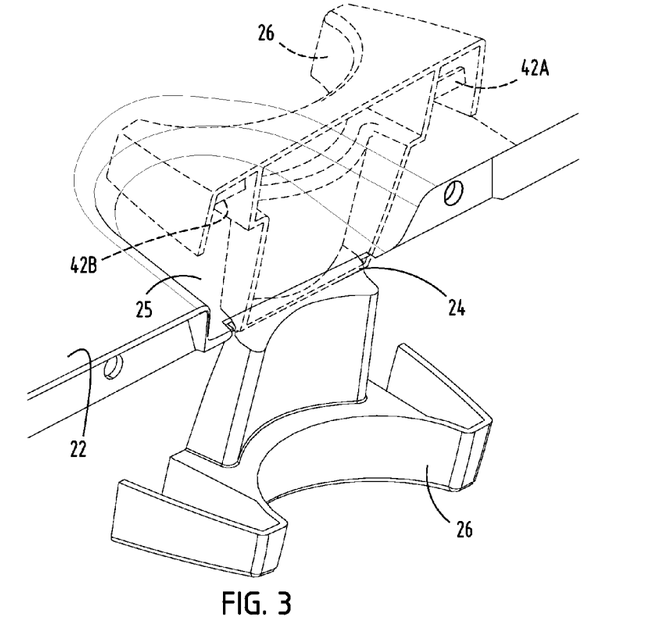
FIG. 3 is an enlarged perspective view of the outer trim panel showing the beverage retainer portion in a molded position and a pivoted beverage retainer position.

For purposes of description herein, the terms "inner," "outer," "upper," "lower," "right," "left," "rear," "front," "vertical," "horizontal," and derivatives thereof shall relate to the vehicle door and the trim panel assembly with storage receptacle and beverage retainer as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

A vehicle trim assembly is shown and described herein in one embodiment having a storage receptacle and a trim component such as a trim panel arranged to define at least a portion of the storage receptacle. The trim panel has a base portion connected to a beverage retainer portion via a living hinge. The beverage retainer portion is pivoted about the living hinge into position within the storage receptacle. A vehicle trim panel is also disclosed which includes a base portion, a beverage retainer portion, and a living hinge connected to the base portion and the beverage retainer portion. In another embodiment, a trim component is employed on a vehicle pillar. The beverage retainer portion is pivoted about the living hinge into position within a storage receptacle. A method of assembling a vehicle trim panel or component is further disclosed in one embodiment which includes forming a trim panel having a main portion, a beverage retainer portion, and a living hinge, rotating the beverage retainer portion about the living hinge into a beverage retainer position, and assembling the trim panel onto a vehicle such that the beverage retainer portion is disposed into the beverage retainer position within a storage receptacle.

Referring to FIGS. 1-6, an automotive vehicle door trim assembly 10 is illustrated having a storage compartment or receptacle 18 and a beverage retainer 26 provided therein, according to one embodiment. As seen in FIG. 1, the trim assembly 10 is provided in the interior side of the vehicle door 2 such that the storage receptacle 18 and beverage retainer 26 is easily accessible to a passenger in the passenger compartment of the vehicle. The storage receptacle 18 is shown provided within the trim assembly 10 generally below the armrest of door 2. It should be appreciated that each door of the vehicle may include a door trim assembly 10 for storing items within one or more storage receptacles 18 and for steadily holding a beverage container 4 within each of one or more beverage retainers 26. It should further be appreciated that the trim assembly 10 may be employed at other locations on board the vehicle such as in the center console or dash, and may provide any number of storage receptacles and beverage retainers according to other embodiments.

The trim assembly 10 generally includes a first or inner trim component shown as trim panel 12 provided on the interior side of the door and a second or outer trim component shown as trim panel 20 provided outward of the inner panel 12 and assembled to the rear side of the inner trim panel 12. The rear trim panel 20 includes a base portion 22 with a shape that defines a substantial bottom and rear portion of the storage receptacle 18. The inner trim panel 12 has an inner upstanding wall 14 which defines an inner wall of the storage compartment 18. As such, the storage compartment defined by base portion 22 and inner upstanding wall 14 defines a storage receptacle 18 for receiving items of storage on the door 2.

Figure 4:
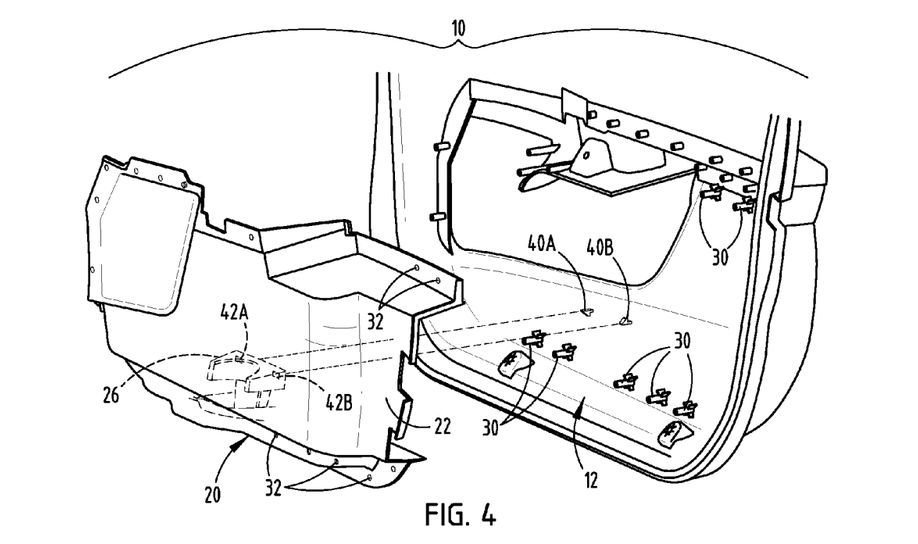
FIG. 4 is an exploded outer perspective view of the trim assembly further illustrating rotation of the beverage retainer.

The outer trim panel 20 includes the base portion 22 that defines at least a portion of the storage receptacle and a beverage retainer portion 26 that is connected to the base portion 22 via a living hinge 24. Base portion 22 has a recessed bottom portion 25 sized and shaped to receive the bottom side of the beverage container 4. The beverage retainer portion 26 pivots approximately one hundred eighty degrees (180°) relative to base portion 22 about the living hinge 24 into a beverage retainer position that is substantially vertical as shown in FIG. 4 to fit within the storage receptacle 18. The outer trim panel 20 is formed of a moldable material such that the base portion 22, beverage retainer portion 26 and living hinge 24 may be integrally formed by a molding process, such as injection molding. Base portion 22 may be made of a moldable polymer, such as plastic, according to one embodiment. The living hinge 24 may have a thin portion that forms a U-shape when the beverage retainer portion 26 is pivoted to its beverage retainer position, according to one embodiment. The living hinge 24 has a reduced thickness area that allows for the pivoting motion of the beverage retainer portion 26 relative to the base portion 22 during assembly.

Figure 5:
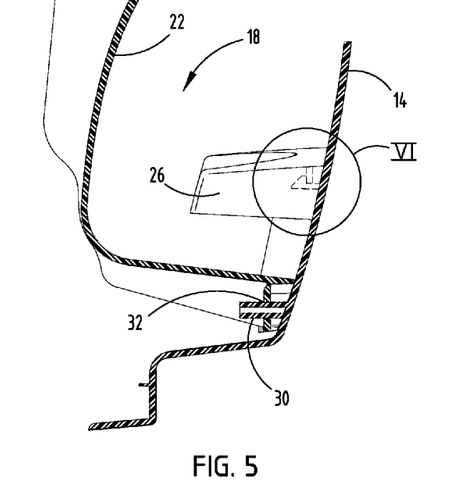
FIG. 5 is a cross-sectional view through the assembly further illustrating the connection of the inner and outer trim panels.

Referring to FIG. 4, the outer trim panel 20 is shown positioned for assembly onto the rear or outer side of the inner trim panel 12. The inner trim panel 12 has a plurality of connectors, such as male pins 30 positioned to engage and connect to a plurality of female receptacles or openings 32 provided in the outer trim panel 20. The beverage retainer portion 26 of the outer trim panel 20 is pivoted relative to the base portion 22 about the living hinge 24 from its substantially planar molded position to an upward beverage retainer position as shown during assembly. The outer trim panel 20 is then aligned such that the holes 32 in outer trim panel 20 are matingly engaged with connectors 30 of the inner trim panel 12 and fastened thereto to provide the assembled trim assembly 10. Referring to FIG. 5, the assembled parts are shown connected together in which each male pin connector 30 is fully engaged within the female connector 32 to assemble and retain the outer trim panel 20 to the inner trim panel 12. It should be appreciated that a plurality of connectors 30 and 32 are provided to sufficiently hold the outer trim panel 20 steadily in place relative to the inner panel 14, and that any of a number of connector members may be employed.

Figure 6:
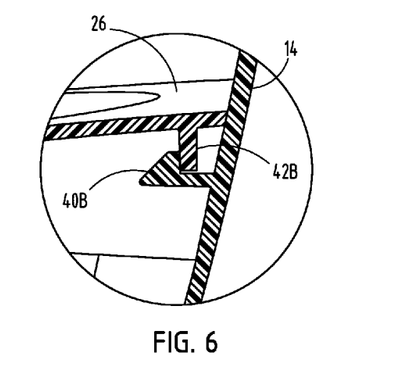
FIG. 6 is an enlarged view of section VI of FIG. 5 further illustrating the connection of the beverage retainer.

The rear side of the inner trim panel 12 has a pair of snap fit male retention members 40A and 40B which are aligned to matingly connect with female connectors 42A and 42B on the inner side wall of the beverage retainer portion 26. According to one embodiment, the snap fit connectors 40A and 40B are male connectors that bias into a snap fit connection within female receptacles 42A and 42B on the beverage retainer portion 26. In this embodiment, the snap fit connectors 40A and 40B have prongs, one of which faces down and the other of which faces up. As seen in FIG. 6, snap fit connector 40B matingly engages with female connector 42B to provide a locking connection that holds the beverage retainer 26 fixed in place against the inner trim panel 12. It should be appreciated that various other shaped and sized connectors may be employed to retain beverage retainer 26 in place within the storage receptacle 18. Accordingly, during assembly of the outer trim panel 20 to the rear side of the inner trim panel 12, the beverage retainer portion 26 is snap fit connected onto the inner trim panel 12 to provide for secured assembly of the beverage retainer 26 within the storage receptacle 18.

In the embodiment shown in FIGS. 1-6, the storage receptacle 18 is formed as a map pocket in a vehicle door. The storage receptacle 18 may have a desired shape and size configured to receive various items for storage that are easily accessible to a user within the passenger compartment of the vehicle. The beverage retainer 26 has a shape and size configured to receive a standard beverage container 4 such as a soda bottle or traveling beverage container. The size and shape of the beverage retainer 4 may vary depending upon the size and shape of desired beverage containers to retain therein. According to the embodiment shown in FIGS. 1-6, the beverage retainer 26 is assembled on the inboard or inner side of the storage receptacle 18 such that the beverage retainer 26 retains the beverage container 4 from the inner side of the door 2, and the base portion 22 of the outer trim panel 20 provides an upstanding, vertical rear supporting surface to prevent the beverage container 4 from moving outward. The beverage retainer portion 26 has a semi-circular shape that partially encircles the container 4 to sufficiently retain the beverage container 4 to prevent the container 4 from tipping over during acceleration or deceleration of the vehicle under normal driving conditions.

Figure 7:
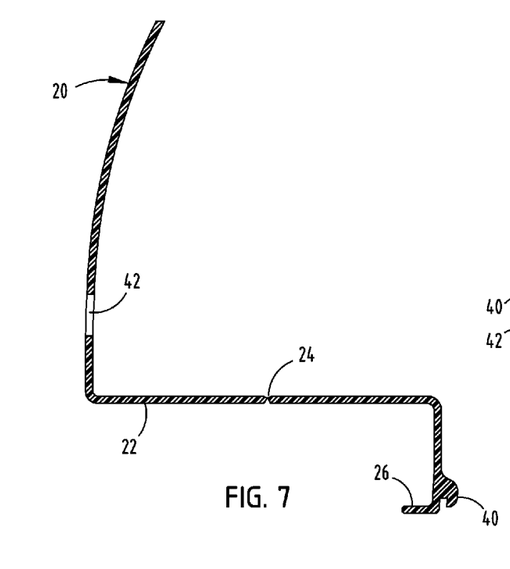
FIG. 7 is a schematic view of a molded trim panel formed with a beverage retainer portion for an outboard retainer embodiment.
Figure 8:
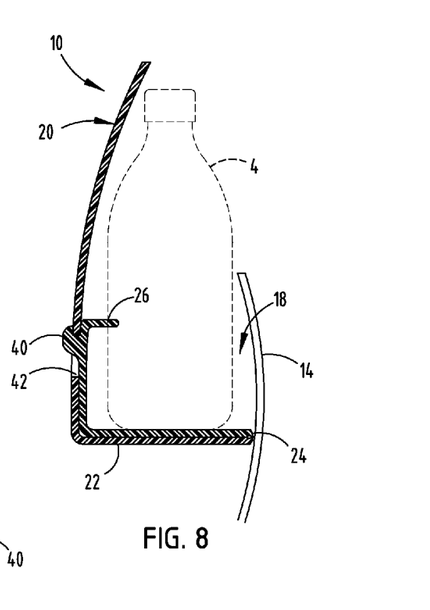
FIG. 8 is a cross-sectional view taken through a trim assembly employing the outboard retainer embodiment of FIG. 7.

According to another embodiment, the beverage retainer 26 may be formed and assembled to engage a beverage container 4 on the outboard or outer side of the storage receptacle 18 as shown in FIGS. 7 and 8. In FIG. 7, the outer trim panel 20 is shown formed having a base portion 22, a beverage retainer portion 26 and an interconnecting living hinge 24. The beverage retainer portion 26 may pivot approximately one hundred eighty degrees (180°) relative to base portion 22 and back onto the base portion 22. The beverage retainer portion 26 may then be connected to the outer side of the base member 22 of the outer trim panel 20 such as by snap fit connections 40 and 42 or other secure connections. Upstanding wall 14 may be provided by an inner trim panel to form the inner wall of storage receptacle 18 and support the beverage container 4 on the inner side.

Accordingly, the vehicle trim assembly 10 and trim component or panel advantageously provides for an integrally formed beverage retainer 26 within a storage compartment 18 of a vehicle in a manner that is easy to produce and requires fewer components. The vehicle trim assembly 10 and method advantageously allows for beverage container 5 to be stabilized within the storage receptacle 18 without the need for a separate piece, multiple tooling and part number setup, packaging and handling. It should be appreciated that the beverage retainer 26 can be recessed flush into the bottom and vertical side wall 14 of the map pocket 18 to provide a clean craftsmanship appearance in which the living hinge 24 is hidden from view.

Figure 9:
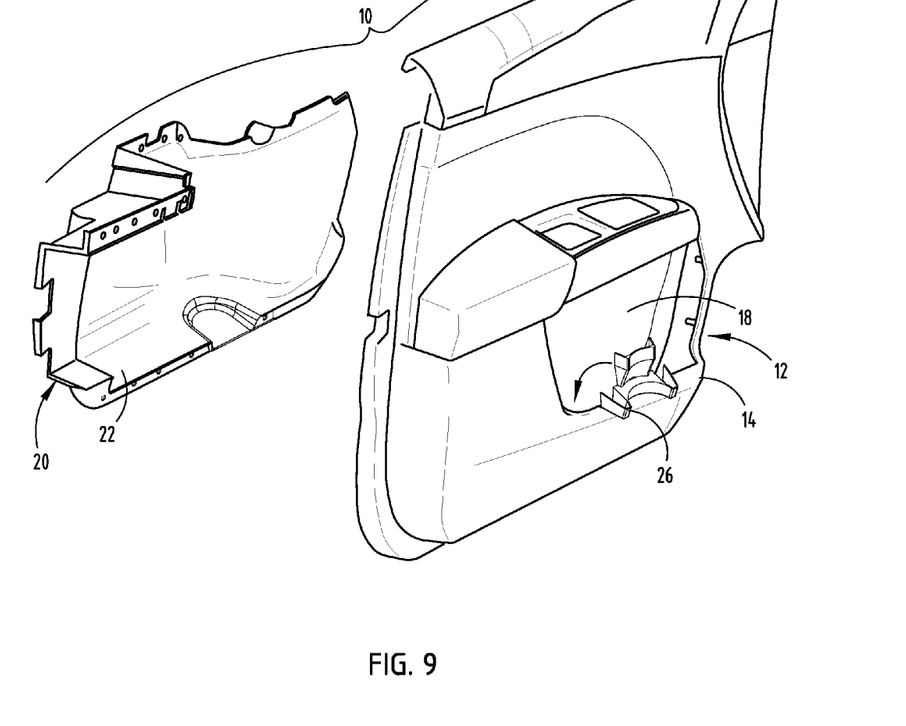
FIG. 9 is an exploded inner perspective view of a vehicle door trim assembly employing a storage receptacle with a beverage retainer provided therein, according to another embodiment.
Figure 10:
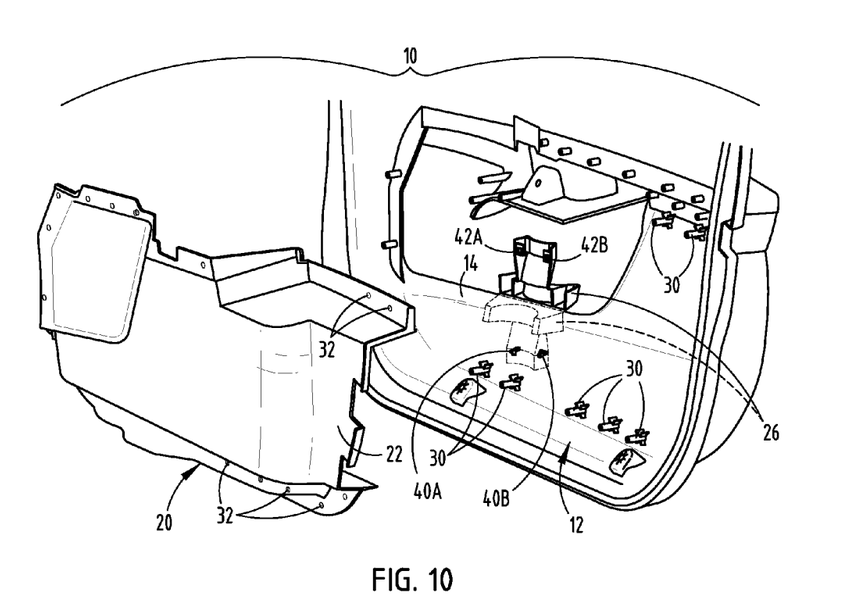
FIG. 10 is an exploded outer perspective view of the door trim assembly shown in FIG. 9 further illustrating rotation of the beverage retainer panel.
Figure 10A:
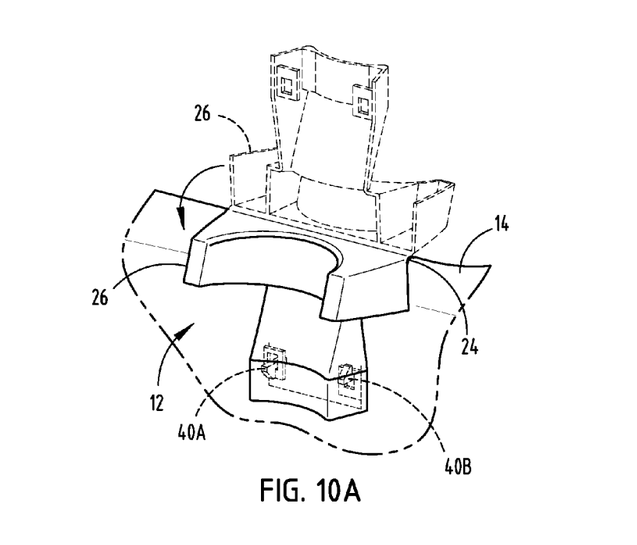
FIG. 10A is an enlarged partial view of the inner trim panel of FIG. 10 showing rotation of the beverage retainer about a living hinge.

Referring to FIGS. 9-10A, a vehicle trim assembly 10 is shown having the beverage retainer portion 26 formed on a trim component shown as the inner trim panel 12, according to another embodiment. In this embodiment, the beverage retainer portion 26 is integrally formed with the inner trim panel 12 to include a living hinge 24 connecting the beverage retainer portion 26 to the base portion 14 of the inner trim panel 12. The beverage retainer portion 26 may be formed as part of the inner trim panel 12 as shown in FIG. 10 and pivoted approximately one hundred eighty degrees (180°) relative to the base portion 14 about the living hinge 24 to a downward position as shown in FIG. 10A during the assembly process. In doing so, female connectors 42A and 42B on the rear side of beverage retainer portion 26 engage snap-fit male retention members 40A and 40B provided on inner panel 12 to retain the beverage retainer portion 26 in the use position as shown in FIG. 10A. In the use position, the beverage retainer portion 26 is configured to retain a beverage container (not shown) from the inboard or inner side of the storage receptacle 18 and may trap the beverage container between the beverage retainer portion 26 and the outer trim panel 20 within the storage compartment 18 of the vehicle door. Accordingly, the beverage retainer portion 26 and living hinge 24 may be formed as part of the inner trim panel 12 or the outer trim panel 20, according to various embodiments.

Figure 11:
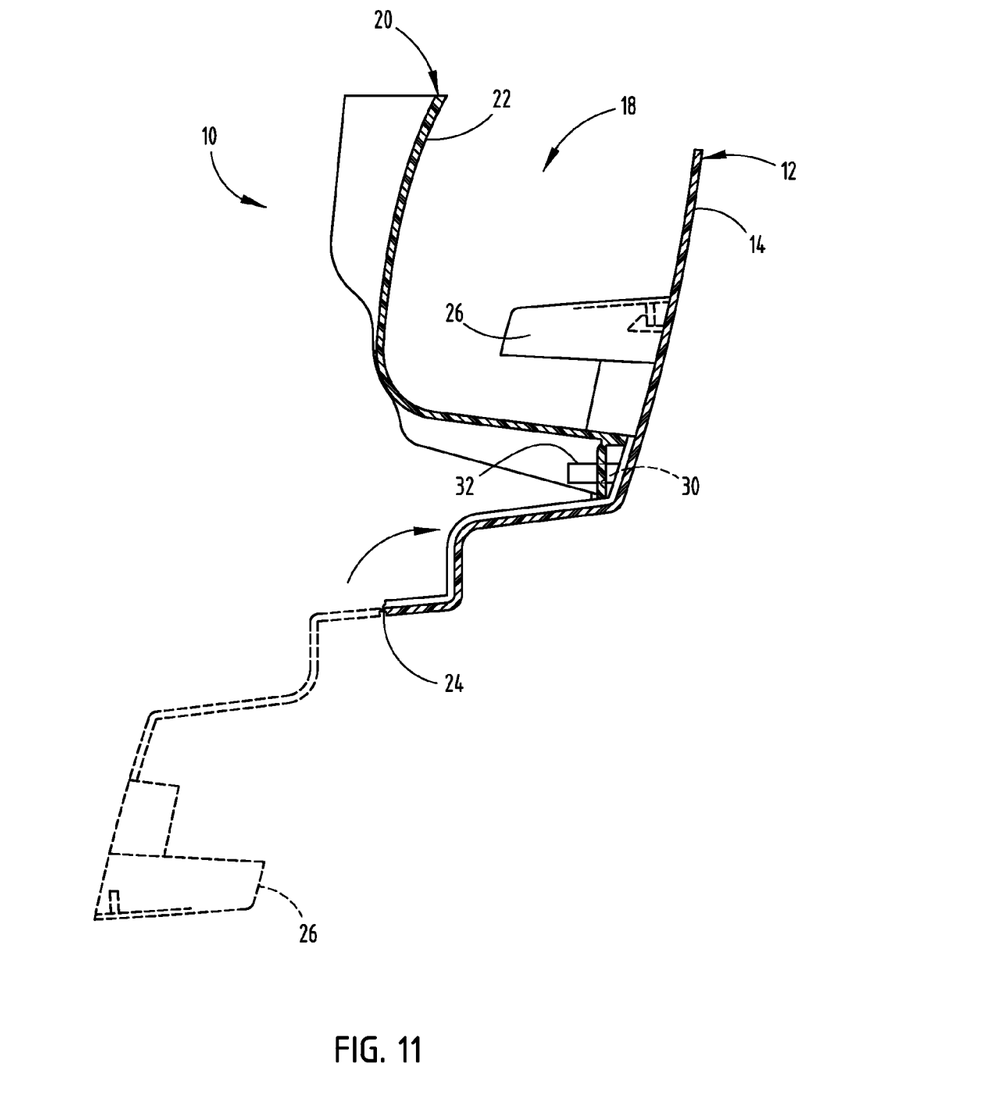
FIG. 11 is a schematic view of a vehicle door trim assembly having an inner molded trim panel formed with a beverage retainer via a living hinge, according to a further embodiment.

Referring to FIG. 11, a vehicle trim assembly 10 is shown having the beverage retainer portion 26 formed on the bottom side of a trim component shown as the inner trim panel 12 and pivoted about living hinge 24 upward to the use position. In the use position, the beverage retainer portion 26 engages a beverage container on the inboard or inner side of the storage receptacle 18. The inner trim panel 12 is shown having a base portion 14, the beverage retainer portion 26, and interconnecting living hinge 24. The beverage retainer portion 26 may pivot approximately one hundred eighty degrees (180°) relative to base portion 14 at back onto the base portion 14. The beverage retainer portion 26 may then be connected to the outer side wall of base portion 14 of the inner trim panel 12 such as by snap-fit connections 40 and 42 or other secure connections to retain the beverage retainer portion 26 in a fixed use position.

Figure 12:
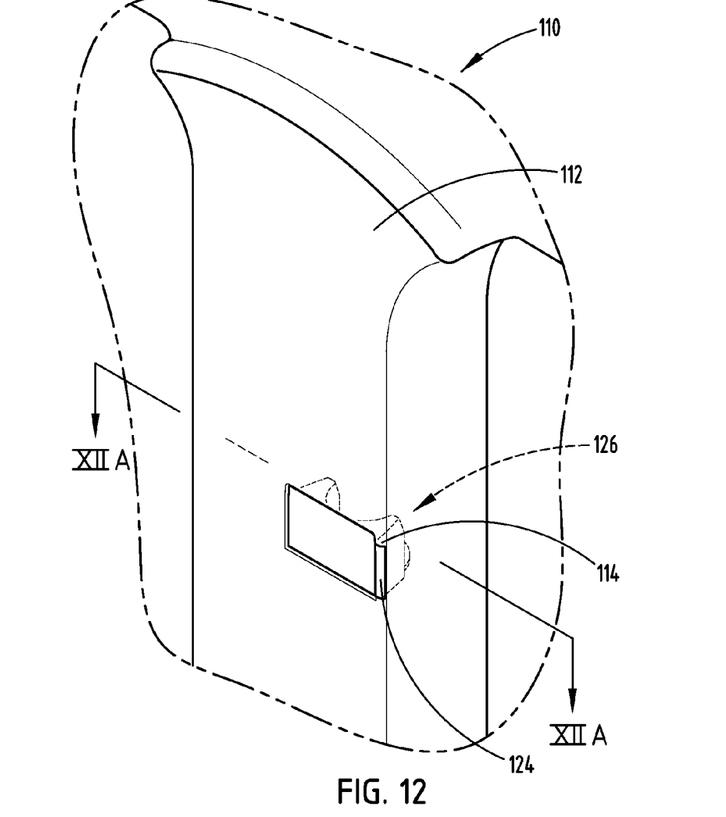
FIG. 12 is a perspective view of a vehicle pillar trim assembly having a beverage retainer provided therein in a stowed position, according to a further embodiment.
Figure 12A:
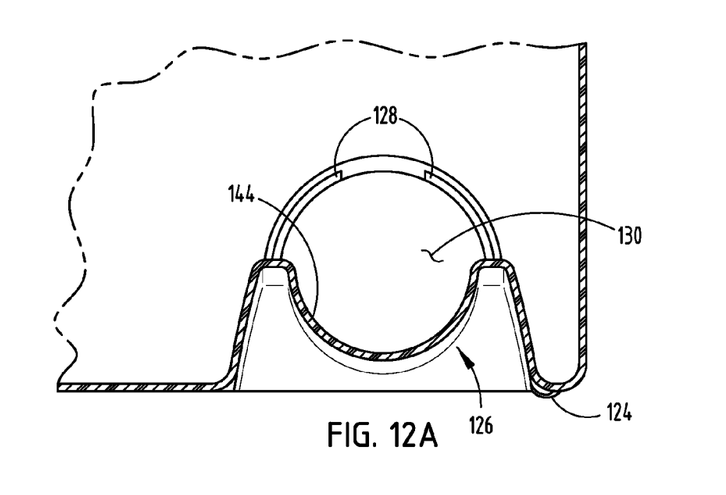
FIG. 12A is a cross-sectional view taken through line XIIA-XIIA of FIG. 12 illustrating storage of the beverage retainer within the trim assembly.
Figure 13:
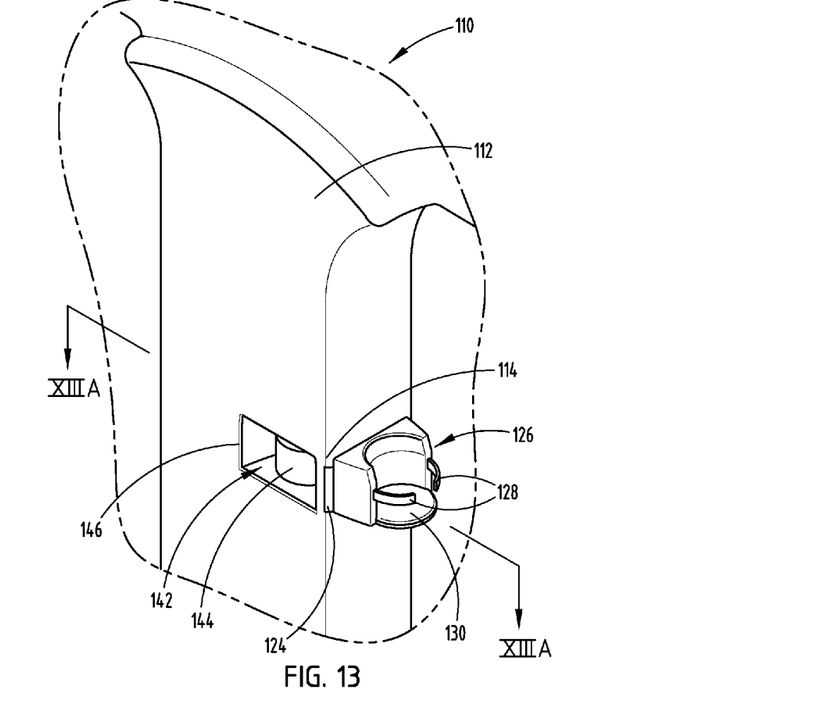
FIG. 13 is a perspective view of the vehicle pillar trim assembly showing the beverage retainer in a use position.
Figure 13A:
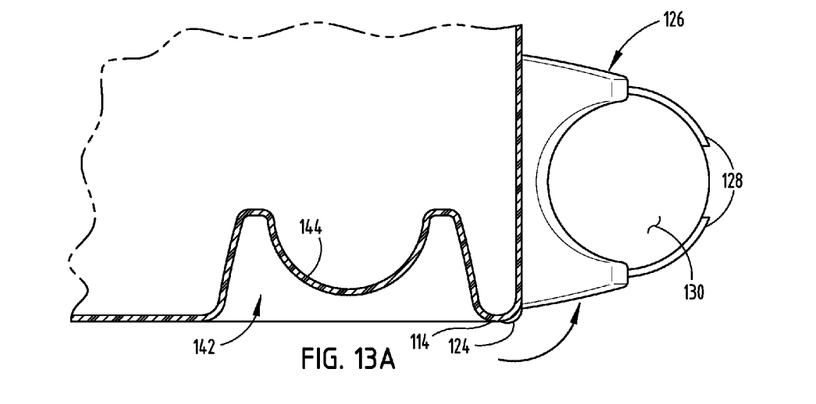
FIG. 13A is a cross-sectional view taken through line XIIA-XIIA of FIG. 13 further illustrating storage of the beverage retainer in the use position.

Referring to FIGS. 12-13A, a vehicle trim assembly 110 is shown providing a stowable beverage retainer within a pillar of the vehicle, such as within the B-pillar adjacent to a passenger seating area of the vehicle. The vehicle trim assembly 110 has a pillar trim component 112 shown as a trim panel that may cover a pillar, such as the B-pillar of the vehicle generally located between the front and rear doors of a passenger vehicle. The trim panel 112 may include a base portion 114, a beverage retainer portion 126 and a living hinge 124. The beverage retainer portion 126, living hinge 124 and base portion 114 may be integrally formed as part of the trim panel 112. The living hinge 124 enables the beverage retainer portion 126 to pivot relative to the base portion 114 between a stowed position as shown in FIGS. 12 and 12A and a use position as shown in FIGS. 13 and 13A. The beverage retainer portion 126 has a shape conforming to the shape of a beverage container (not shown) and includes beverage retainer arms 128 extending therefrom to engage the beverage container and allow for different sized beverage container diameters. The beverage retainer portion 126 further is shown having a bottom support base 130, shown in the shape of a disc, for supporting the bottom of the beverage container.

Formed within the base portion 114 of trim panel 112 is a storage receptacle 142 formed by side walls 146 and including a conforming inner wall 144 for receiving the beverage retainer portion 126. The beverage retainer portion 126 may pivot about living hinge 124 between the use position shown in FIGS. 13 and 13A in which the beverage retainer portion 126 is exposed and configured to receive a beverage container and a stowed position shown in FIGS. 12 and 12A in which the beverage retainer portion 126 is stowed flush within the storage receptacle 142. In doing so, the beverage retainer portion 126 pivots approximately ninety degrees (90°) between the stowed and use positions, in the embodiment shown.

It should further be appreciated that one or more connectors such as connectors 40A and 40B may be employed to connect the beverage retainer portion 126 to the trim panel 112 based portion 114 in the use position and further connectors may be employed to retain the beverage retainer portion 126 in position within the storage receptacle 142. The connectors may be of the type that is disengageable by a user to allow for frequent connection and disconnection to rotate the beverage retainer portion 126 between the use and storage positions. The living hinge 124 may have a sufficient thickness and durability to allow repeated rotation of the beverage retainer portion 126 between the use and stowed positions as demanded by passengers in the vehicle.

While the vehicle trim assembly 110 is shown in FIGS. 12-13A having a trim component provided on a pillar of a vehicle, it should be appreciated that the trim component may be provided at other locations within the vehicle. For example, the trim component may be located within a center console to provide retention of a beverage for passengers in either the front or rear seating areas of the vehicle. It should further be appreciated that the trim component may have different shapes and sizes and may be configured in various orientations to rotate about the living hinge.

Figures 14A, 14B:
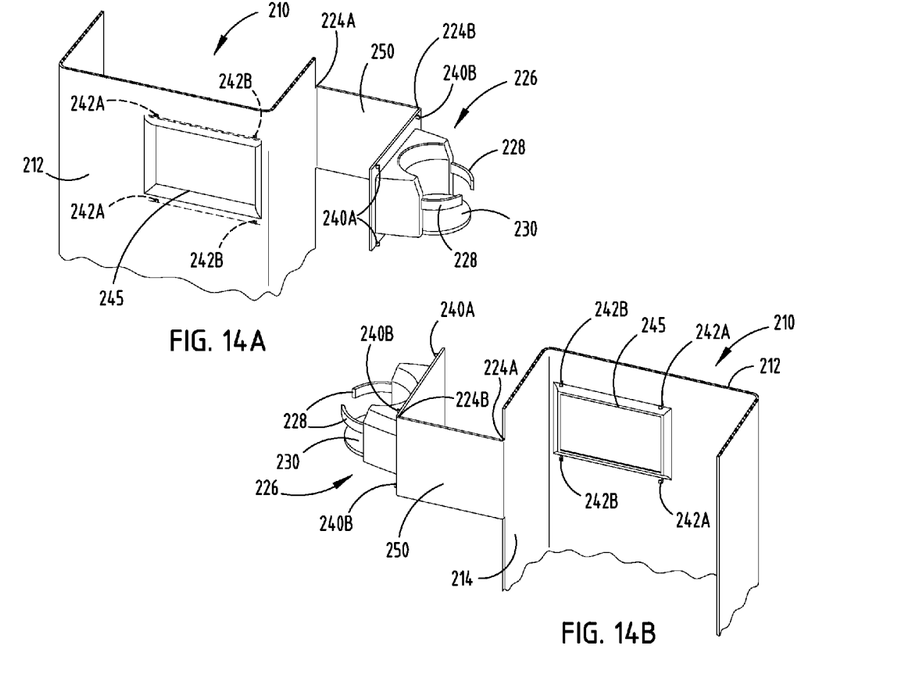
FIG. 14A is a front perspective view of a vehicle pillar trim assembly having a beverage retainer prior to assembly, according to a further embodiment.
FIG. 14B is a rear perspective view of the vehicle pillar trim assembly shown in FIG. 14A.
Figure 14C:
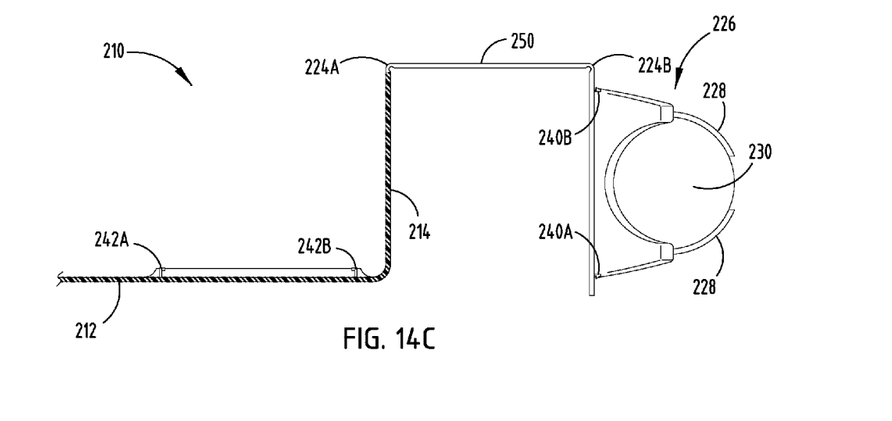
FIG. 14C is a top view of the vehicle pillar trim assembly shown in FIG. 14A.

Referring to FIGS. 14A-16D, a vehicle trim assembly 210 is shown having a beverage retainer 226 formed on a trim panel on a pillar of the vehicle, such as on the B-pillar adjacent to a passenger seating area of the vehicle, according to a further embodiment. The vehicle trim assembly 210 has a pillar trim component 212 shown as a trim panel that may cover a pillar, such as the B-pillar of the vehicle generally located between the front and rear doors of a passenger vehicle. The trim panel 212 may include a base portion 214 shown having side walls, a beverage retainer portion 226, an intermediate connecting strip 250, and first and second living hinges 224A and 224B. The first living hinge 224A forms a hinge that in interconnects the base member 214 to strip 250, and the second living hinge 224B forms a hinge that connects strips 250 to the beverage retainer portion 226. The beverage retainer portion 226, living hinges 224A and 224B, strip 250, and base portion 214 may be integrally formed as part of the trim panel 212. The first and second living hinges 224A and 224B enable the beverage retainer portion 226 and strip 250 to pivot relative to the base portion 214 between an unassembled position as shown in FIGS. 14A-14C and a fully assembled use position as shown in FIGS. 16A-16C. The beverage retainer portion 226 has a shape conforming to the shape of a beverage container (not shown) and includes beverage retainer arms 128 extending therefrom to engage the beverage container and allow for different sized beverage container diameters. The beverage retainer portion 226 further is shown having a bottom support base 230, shown in the shape of a disc, for supporting the bottom of the beverage container.

Figure 15A:
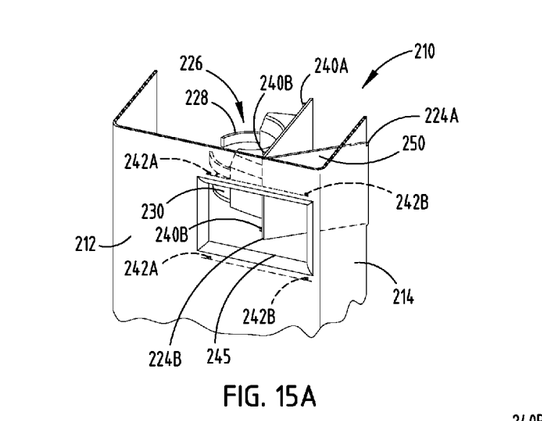
FIG. 15A is a front perspective view of the vehicle pillar trim assembly shown in FIG. 14A with the beverage retainer portion partially assembled.
Figure 15B:
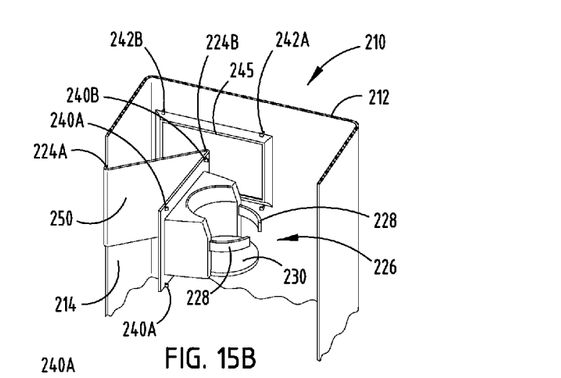
FIG. 15B is a rear perspective view of the partially assembled vehicle pillar trim assembly shown in FIG. 15A.
Figure 15C:
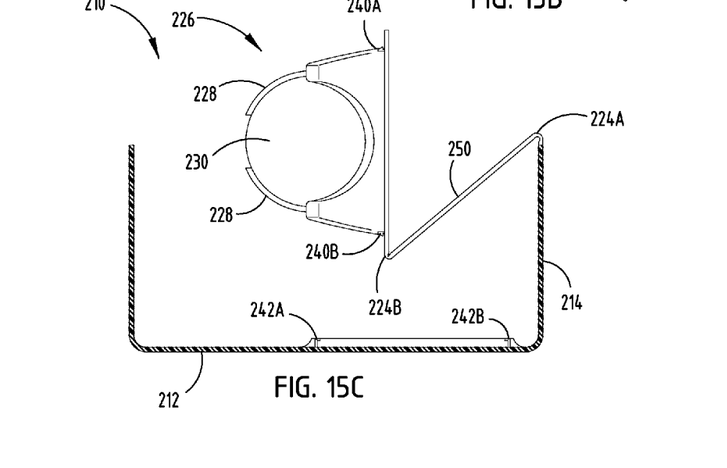
FIG. 15C is a top view of the partially assembled vehicle pillar trim assembly shown in FIG. 15A.
Figure 16A:
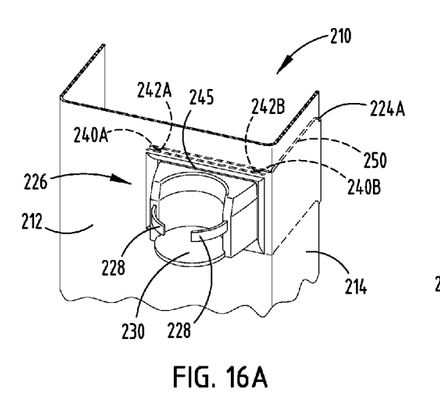
FIG. 16A is a front perspective view of the fully assembled vehicle pillar trim assembly shown in FIG. 14A.
Figure 16B:
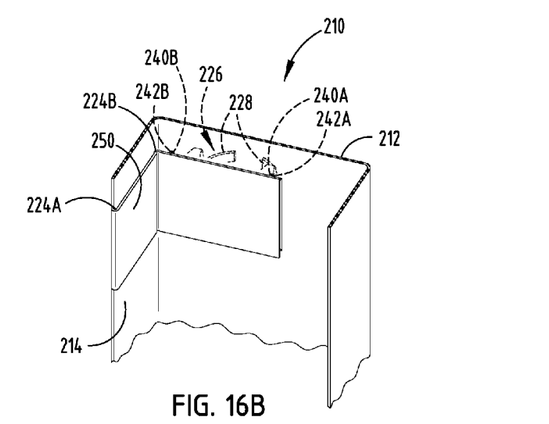
FIG. 16B is a rear perspective view of the vehicle pillar trim assembly shown in FIG. 16A.
Figure 16C:
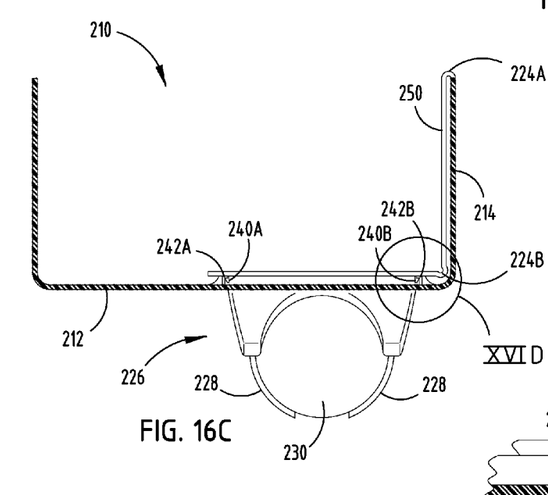
FIG. 16C is a top view of the vehicle pillar trim assembly shown in FIG. 16A.
Figure 16D:
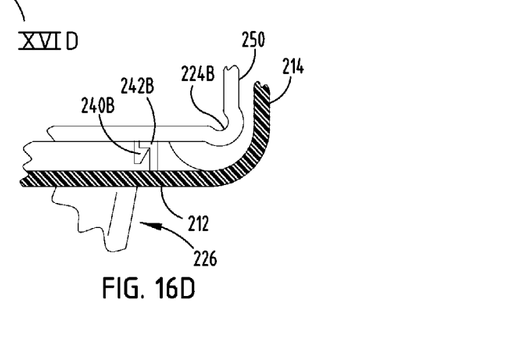
FIG. 16D is an enlarged sectional view of section XVI taken from FIG. 16C.

Formed within the front wall of trim panel 212 is a receptacle or opening 245 for receiving the beverage retainer portion 226 during the assembly process. Opening 245 is shown having a rectangular opening sized to receive the beverage retainer portion which extends through the opening 245 from the backs side and protrudes outward from the front side. The assembly of the beverage retainer portion 226 through opening 245 is illustrated in FIGS. 15A-15C in a partial assembled position and is shown in a fully assembled position in FIGS. 16A-16D. Referring to FIGS. 15A-15C, the beverage retainer portion 226 is pivoted about both the first and second living hinges 224A and 224B such that strip 250 pivots about the first living hinge 224A and the beverage retainer portion 226 pivots about the second living hinge 224B to rotate inwards from the rear side of the trim panel 212. Referring to FIGS. 16A-16D, the strip 250 and beverage retainer portion 226 continue to rotate inward from the rear side of the trim panel 212 such that the strip 250 comes into contact or close proximity to the inner side wall of trim panel 212 and beverage retainer portion 226 pivots and extends through opening 245 into a use position.

In the use position, the beverage retainer portion 226 is snap-fit into place by a pair of snap-fit retention members 240A and 240B which are aligned to matingly connect with connectors 242A and 242B, respectively, on the inner wall of the trim panel 212. The snap-fit connectors 240A and 240B may be male connectors that bias into a snap-fit connection within female receptacles 242A and 242B. The snap-fit connectors 240A and 240B may have prongs, one of which faces down and the other which faces up and engage the connectors 242A and 242B, respectively, to provide a locking connection that holds the beverage retainer portion 226 fixed in place against the trim panel 212. It should be appreciated that various other shaped and sized connectors may be employed to retain the beverage retainer portion 226 in place within the opening 245.

While the vehicle trim assembly 210 is shown in FIGS. 14A-16D having a trim component provided on a pillar of a vehicle, it should be appreciated that the trim component may be provided at other locations within the vehicle. For example, the trim component may be located within a center console to provide retention of a beverage for passengers in either the front or rear seating areas of the vehicle. It should further be appreciated that the trim component may have different shapes and sizes and may be configured in various orientations to rotate about the first and second living hinges 224A and 224B. It should further be appreciated that more than two living hinges may be employed according to further embodiments.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A method of assembling a vehicle molded trim component comprising:
    molding a trim component to integrally form a main portion, a beverage retainer portion, and first and second living hinges;
    assembling the trim component onto a vehicle; and
    rotating the beverage retainer portion about the first and second living hinges into a beverage retainer position.

2. The method of claim 1, wherein the step of assembling comprises assembling the trim component onto a vehicle pillar, wherein the beverage retainer portion pivots about the first and second living hinges into a use position extending from the pillar.

3. The method of claim 1, wherein the trim component comprises a polymeric material.

4. A method of assembling a vehicle molded trim component comprising;
   molding a trim component to integrally form a main portion, a beverage retainer portion, and a living hinge;
   assembling the trim component onto a door panel which includes a wall of a storage receptacle on a vehicle: and
   rotating the beverage retainer portion about the living hinge into a beverage retainer position, wherein the beverage retainer portion is snap fit into the wall of the storage receptacle.

5. The method of claim 4, wherein the step of assembling comprises assembling the trim component to a vehicle door.

6. A method of assembling a vehicle trim component onto a vehicle pillar, comprising:
   forming a trim component having a main portion, a beverage retainer portion, and at least one living hinge;
   assembling the trim component onto the vehicle pillar; and
   rotating the beverage retainer portion about the at least one living hinge and through an opening into a beverage retainer use position extending from the pillar.

7. The method of claim 6, wherein the step of rotating the beverage retainer portion comprises rotating the beverage retainer portion about first and second living hinges.

8. The method of claim 6, wherein the step of forming comprises molding the trim component to integrally form the main portion, the beverage retainer portion, and the at least one living hinge.

9. A method of assembling a vehicle molded trim component onto a vehicle pillar, comprising:
   molding a trim component to integrally form a main portion, a beverage retainer portion, and a living hinge;
   assembling the trim component onto the vehicle pillar; and
   rotating the beverage retainer portion about the at least one living hinge into a beverage retainer position.

10. The method of claim 9, wherein the beverage retainer portion pivots about the at least one living hinge and extends through an opening into a use position extending from the pillar.

11. The method of claim 9, wherein the step of rotating the beverage retainer portion comprises rotating the beverage retainer portion about first and second living hinges.

12. The method of claim 9, wherein the trim component comprises a polymeric material.

* * * * *